US012697701B2

(12) United States Patent
Kelly

(10) Patent No.: US 12,697,701 B2
(45) Date of Patent: Aug. 4, 2026

(54) CNC SLAT CUTTING TABLE CLAMPS AND CLAMPING METHODS

(71) Applicant: George W. Kelly, Sun Prairie, WI (US)

(72) Inventor: George W. Kelly, Sun Prairie, WI (US)

( * ) Notice: Subject to any disclaimer, the term of this patent is extended or adjusted under 35 U.S.C. 154(b) by 0 days.

(21) Appl. No.: 18/537,139

(22) Filed: Dec. 12, 2023

(65) Prior Publication Data

US 2024/0208008 A1 Jun. 27, 2024

Related U.S. Application Data

(60) Provisional application No. 63/387,029, filed on Dec. 12, 2022.

(51) Int. Cl.
*B25B 5/00* (2006.01)
*B25B 5/02* (2006.01)
*B25B 5/10* (2006.01)

(52) U.S. Cl.
CPC ................ *B25B 5/10* (2013.01); *B25B 5/003* (2013.01); *B25B 5/02* (2013.01)

(58) Field of Classification Search
CPC .............. B25B 5/10; B25B 5/003; B25B 5/02
See application file for complete search history.

(56) References Cited

U.S. PATENT DOCUMENTS

2021/0276155 A1* 9/2021 Marx ...................... B25B 5/003

* cited by examiner

*Primary Examiner* — Nirvana Deonauth
(74) *Attorney, Agent, or Firm* — David A. Casimir; Casimir Jones, S.C.

(57) ABSTRACT

Provided herein is a method of clamping an object to a CNC slat cutting table, wherein a CNC slat cutting table clamp comprises two or more clamping arms. The method comprises, positioning a first clamping arm below one or more slats of a CNC slat cutting table and a second clamping arm above the one or more slats, and adjusting the position of the first clamping arm from above the one or more slats until the clamp is secure on the CNC slat cutting table. An operator can safely position the CNC slat cutting table clamp on the CNC slat cutting table and adjust the position of the first clamping arm without reaching below the one or more slats.

8 Claims, 11 Drawing Sheets

CNC SLAT CUTTING TABLE CLAMPS AND CLAMPING METHODS

CROSS-REFERENCED TO RELATED APPLICATIONS

The present application claims the benefit of U.S. Provisional Patent Application Ser. No. 63/387,029, filed Dec. 12, 2022, which is incorporated by reference in its entirety.

FIELD

This application pertains to mechanical clamps for machining on a CNC slat cutting table.

BACKGROUND

Plasma or water-jet cutting is a popular method in industrial manufacturing for fabricating parts that require highly accurate dimensions. Almost all industrial machining, including plasma or water-jet cutting is done with computer numerical control (CNC) automating the machine. Plasma or water-jet cutting is done on a slat cutting table, which frequently contains a water bath underneath the slats for temperature controlling. The basic methodology of this practice is to place an object on the slats of the slat cutting table, and then cut the object from above using a plasma or water-jet cutter.

The slats and water bath provide numerous benefits, such as support, temperature control, and debris control; however, wear and tear on the slats makes them razor sharp, and the wear bath becomes very dirty. Razor sharp slats and dirty water are both safety risks on their own, but in combination they become even more dangerous when the razor-sharp slats cut an operator, who subsequently reaches into the dirty water, exposing a cut the dirty water, increasing the risk of harm.

It is best for the machine operator to keep their hands away from the razor-sharp slats and dirty water, even in gloves; however, the currently used method of clamping the objects to be cut to the machine require the operator to reach below the slats, into the dirty water, to tighten the clamp.

SUMMARY

The disclosure provides, in one aspect, a method of clamping an object to a CNC slat cutting table, wherein a CNC slat cutting table clamp includes two or more clamping arms, the method comprising, positioning a first clamping arm below one or more slats of a CNC slat cutting table and a second clamping arm above the one or more slats, adjusting the position of the first clamping arm from above the one or more slats until the CNC slat cutting table clamp is secure on the CNC slat cutting table.

In some embodiments, the first clamping arm includes a threaded hole, where the threaded bolt is configured to engage the threaded hole.

In some embodiments, the first clamping arm is placed in a water bath below the one or more slats.

In some embodiments, adjusting the position of the first clamping arm from above the one or more slats includes turning a threaded bolt until the CNC slat cutting table clamp is secure on the CNC slat cutting table.

In some embodiments, adjusting the position of the first clamping arm includes turning a threaded bolt by turning a head of the threaded bolt, where the head of the threaded bolt is positioned above the second clamping arm.

In some embodiments, the first clamping arm is positioned below the one or more slats without an operator reaching below the one or more slats.

In some embodiments, an operator can safely position the CNC slat cutting table clamp on the CNC slat cutting table and adjust the position of the first clamping arm without reaching below the one or more slats.

In some embodiments, the position of the first clamping arm is adjusted, and the first clamping arm is secure on the one or more slats.

In some embodiments, adjusting the position of the first clamping arm from above the one or more slats secures an object on the CNC slat cutting table, where the object is positioned between the second clamping arm and the one or more slats.

In some embodiments, the object is a piece of metal.

The disclosure provides, in another aspect, a CNC slat cutting table clamp for securing metal to a CNC slat cutting table, including, two or more clamping arms, where a first clamping arm and a second clamping arm are positioned perpendicular to each other, a bottom plate, one or more support rods positioned between the bottom plate and the second clamping arm, with the one or more support rods passing through the first clamping arm, and a threaded bolt positioned passing through the first clamping arm, where a head of the threaded bolt is positioned above the second clamping arm, and where the first clamping arm is adjustable by rotating the threaded bolt.

In some embodiments, a length of the first clamping arm is 5.5 inches, a width of the first clamping arm is 0.50 inches, and a thickness of the first clamping arm is 0.25 inches.

In some embodiments, a length of the second clamping arm is 5.5 inches, a width of the second clamping arm is 0.50 inches, and a thickness of the second clamping arm is 0.25 inches.

In some embodiments, a length of the bottom plate is 1.25 inches, a width of the bottom plate is 0.50 inches, and a thickness of the bottom plate is 0.25 inches.

In some embodiments, a length of the support rods is 6.75 inches, and a diameter of the support rods is 0.3125 inches.

In some embodiments, a length of the threaded bolt is 7.0 inches, and a diameter of the threaded bolt is 0.3125 inches.

In some embodiments, the threaded bolt includes one or more of ACME $3/8^{th}\times 8$ and UNC 5/16 18 threading.

In some embodiments, the threaded bolt includes a head of the threaded bolt, where the head of the threaded bolt is a nut size of 0.625 inches.

In some embodiments, the threaded bolt includes a threaded rod and a threaded nut, where the threaded nut is welded to one end of the threaded rod.

In some embodiments, the overall height is 7.25 inches, the overall width is 5.5 inches, and the maximum thickness is 5.5 inches.

The disclosure provides, in another aspect, a CNC slat cutting table system, including, a CNC slat cutting table for use in industrial metal cutting with a water bath positioned beneath the CNC slat cutting table and a high energy beam positioned above the CNC slat cutting table for cutting metal, and one or more CNC slat cutting table clamps for securing pieces of metal to the CNC slat cutting table, where the one or more clamps are adjustable from above the one or more slats.

In some embodiments, the CNC slat cutting table system comprises an actuator.

In some embodiments, the one or more CNC slat cutting table clamps are positioned by the actuator on the CNC slat cutting table.

In some embodiments, the position of the first clamping arm of one or more of the CNC slat cutting table clamps is adjusted by the actuator.

In some embodiments, the actuator is automated.

In some embodiments, the actuator is automated by a processor running a computer program product, including a non-transitory computer readable storage medium to store a computer readable program, where the computer readable program, when executed by the processor within a computer, causes the computer to perform operations for industrial CNC machining, the operations being the following steps: locating and positioning an initial object onto the one or more slats of a CNC slat cutting table, locating and positioning the one or more CNC slat cutting table clamps onto the CNC slat cutting table, where for each CNC slat cutting table clamps, the first clamping arm is positioned below the one or more slats, and the second clamping arm is positioned above the one or more slats and above the initial object, tightening the one or more CNC slat cutting table clamps, where tightening is performed by rotating the head of the threaded bolt on each of the CNC slat cutting table clamps, until the initial object is secure on the CNC slat cutting table, performing steps for industrial CNC machining, where the initial object is machined, and a final object has different dimensions than the initial object, loosening the one or more CNC slat cutting table clamps, where loosening is performed by rotating the head of the threaded bolt on each of the CNC slat cutting table clamps, until the final object is loose on the CNC slat cutting table, locating and removing the one or more CNC slat cutting table clamps from the CNC slat cutting table, and locating and removing the final object from the CNC slat cutting table.

Other aspects of the disclosure will become apparent by consideration of the detailed description and accompanying drawings.

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Figure 1:
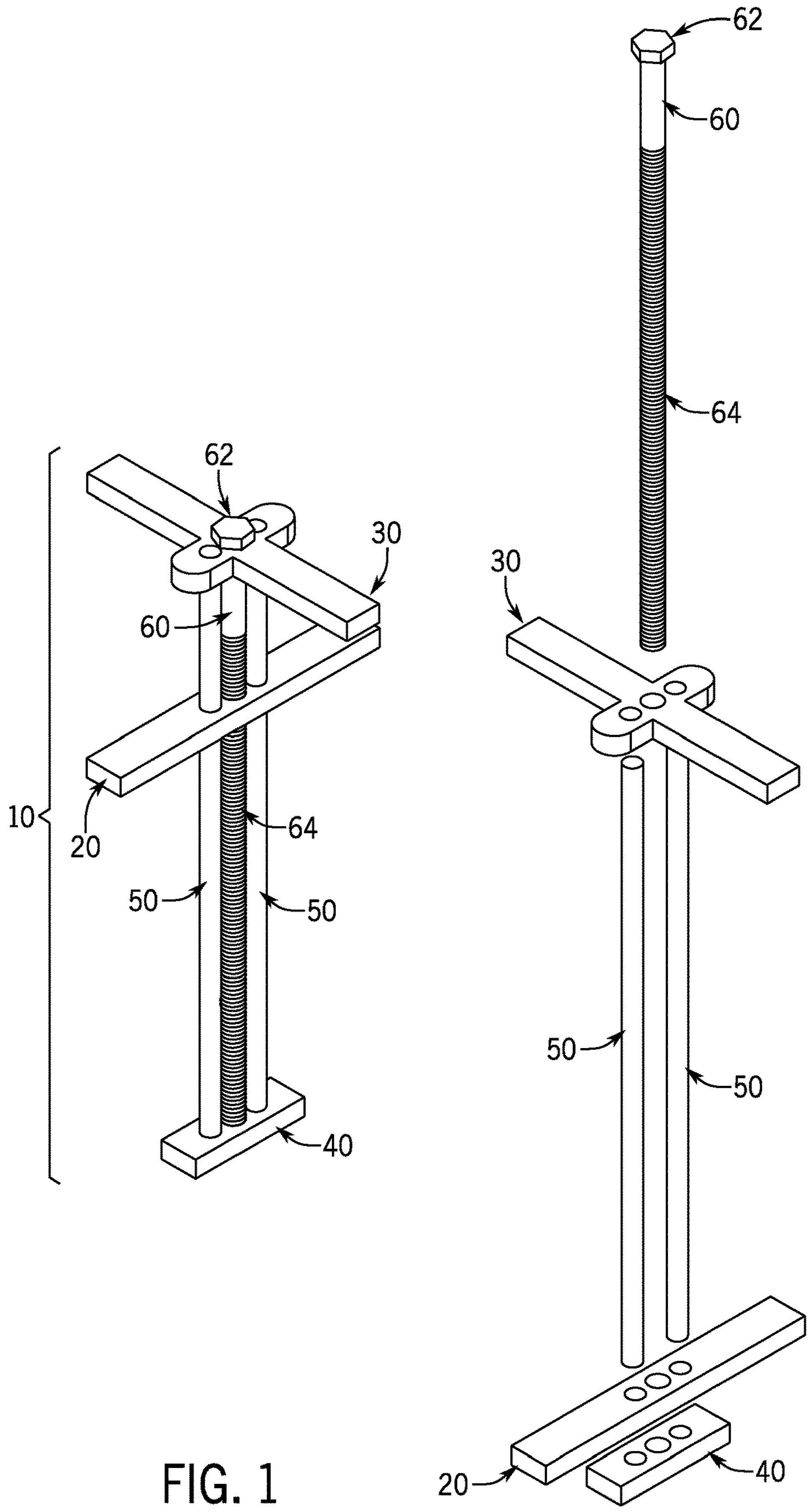
FIG. 1 depicts a technical drawing of an exemplary CNC slat cutting table clamp.

With reference to FIG. 1, a CNC slat cutting table clamp 10 includes a first clamping arm 20, a second clamping arm 30, a bottom plate 40, two support rods 50, and a threaded bolt 60. In the illustrated embodiment, the first clamping arm 20 and the second clamping arm 30 are perpendicular to each other. In some embodiments, the first clamping arm 20 and the second clamping arm 30 are parallel to each other (not shown). In the illustrated embodiment, the two support rods 50 are positioned between the second clamping arm 30 and the bottom plate 40. The two support rods 50 and the threaded bolt pass 60 through the first clamping arm 20, which is positioned between the second clamping arm 30 and the bottom plate 40. A bottom end of the threaded bolt 60 is positioned on the bottom plate 40. The left image in FIG. 1 shows an assembled clamp with the first clamping arm 20 in a partially raised position. The right image in FIG. 1 shows a disassembled view of the clamp.

Figure 2:
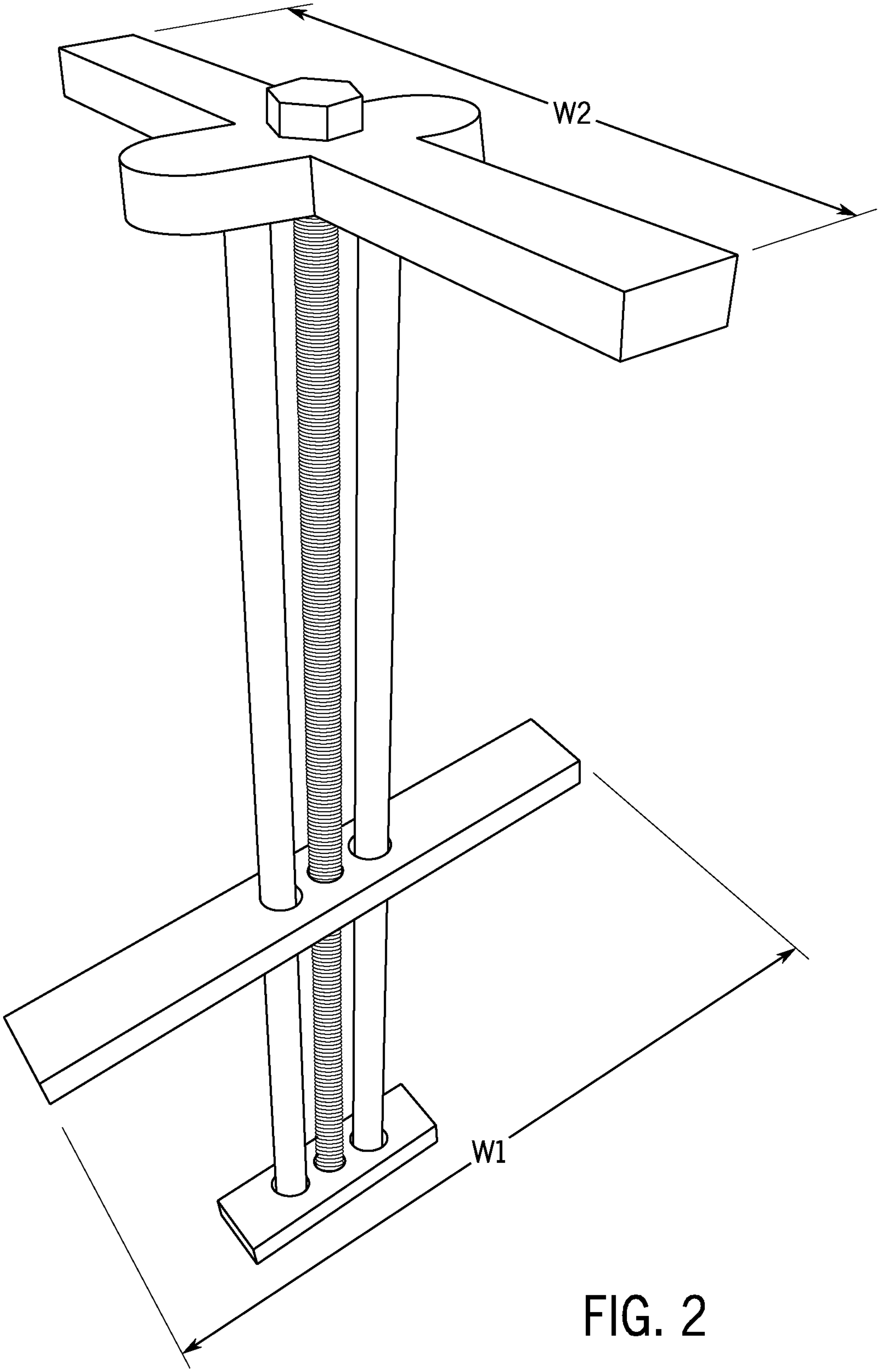
FIG. 2 depicts an isometric view of the CNC slat cutting table clamp.

With reference to FIG. 1 and FIG. 2, a position of the first clamping arm 20 is adjustable along the threaded bolt. The threaded bolt 60 includes a head 62 of the threaded bolt. In some embodiments, the threaded bolt 60 includes a threaded rod 64 and a threaded nut, where the threaded nut is welded or otherwise fastened onto one end of the threaded rod to create the threaded bolt 60 and the head 62 of the threaded bolt. In the illustrated embodiment, the head 62 of the threaded bolt is positioned above the second clamping arm 30. In some embodiments, the position of the first clamping arm 20 is adjusted by rotating the head 62 of the threaded bolt 60 positioned above the second clamping arm 30. In other words, the position of the first clamping arm 20 is adjusted on the threaded bolt 60 by tightening and/or loosening the head 62 of the threaded bolt 60.

With continued reference to FIG. 1 and FIG. 2, in some embodiments, the first clamping arm 20 is positioned below one or more slats of a CNC slat cutting table. The second clamping arm 30 is positioned above the one or more slats. In some embodiments, the position of the first clamping 20 arm is adjusted from above the one or more slats by turning the threaded bolt 60. In some embodiments, turning the threaded bolt 60 includes turning the head 62 of the threaded bolt 62. Turning either the head 62 of the threaded bolt or the threaded bolt 60 includes tightening and loosening. Adjusting the position of the first clamping arm 20 from above the one or more slats allows an operator to safely secure the CNC slat cutting table clamp onto the CNC slat cutting table without reaching below the one or more slats.

Figure 3:
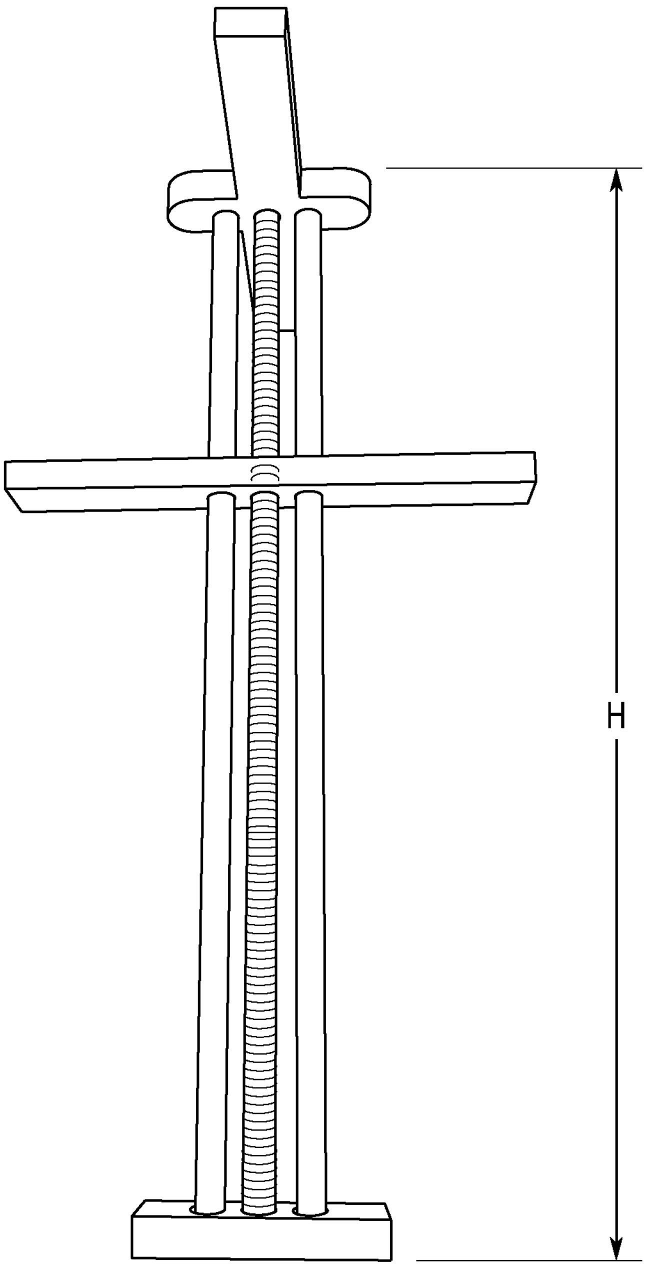
FIG. 3 depicts a side view of a first embodiment of the CNC slat cutting table clamp.

With reference to FIG. 3, an embodiment of the CNC slat cutting table clamp is depicted. In the illustrated embodiment, the first clamping arm includes a threaded hole. The threaded bolt interacts with the threaded hole when adjusting the position of the first clamping arm. Both the threaded bolt and the threaded hole include threading. In the illustrated embodiment, the head of the threaded bolt is rotated, and the threaded bolt, engaging with the threaded hole, adjusts the position of the first clamping arm.

Figure 4:
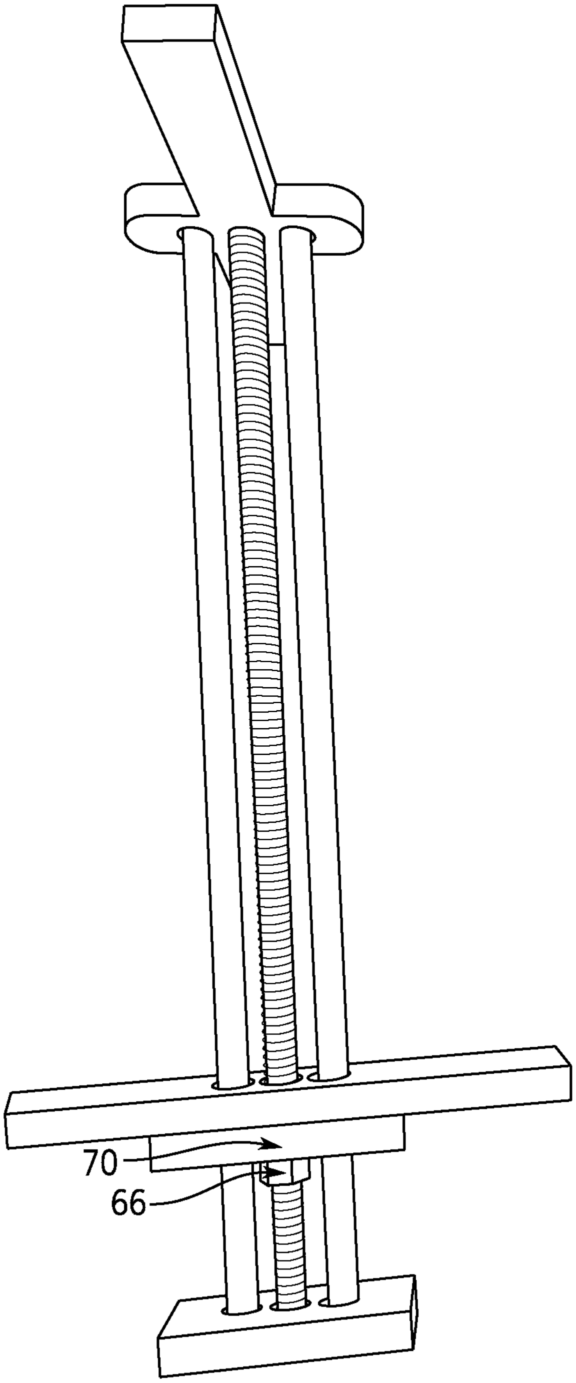
FIG. 4 depicts a side view of a second embodiment of the CNC slat cutting table clamp.

With reference to FIG. 4, another embodiment of the CNC slat cutting table clamp is depicted. In the illustrated embodiment, a threaded adjustment nut 66 is positioned on the threaded bolt, below the first clamping arm. In the illustrated embodiment, the first clamping arm includes a center hole. The center hole is unthreaded. In the illustrated embodiment, the threaded adjustment nut is rotated, adjusting the position of the first clamping arm along the threaded bolt. In some embodiments, an adjustment plate 70 is positioned between the first clamping arm and the threaded adjustment nut, on the threaded rod. The adjustment plate aids in adjusting the position of the first clamping arm when the threaded adjustment nut is rotated.

Figure 6:
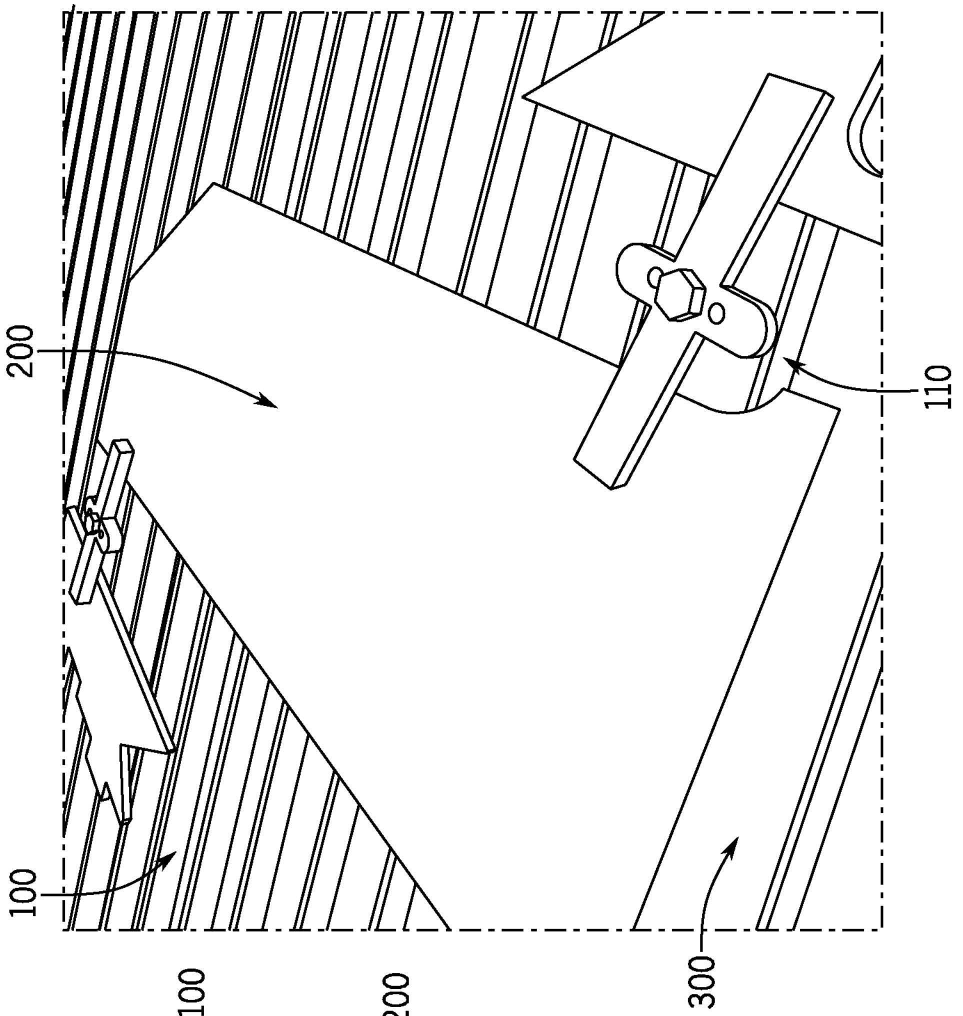
FIG. 6 depicts a view of the CNC slat cutting table clamp in use with a CNC slat cutting table and a piece of metal.
Figure 5:
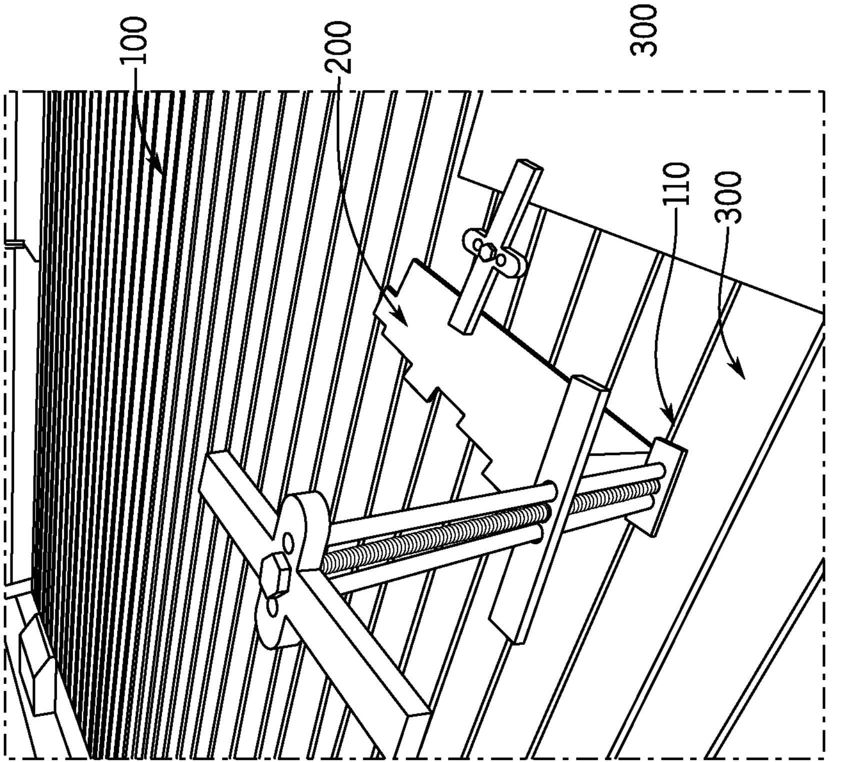
FIG. 5 depicts a view of the CNC slat cutting table clamp before being placed for use with a CNC slat cutting table and a piece of metal.

FIG. 5 through FIG. 8 demonstrate the CNC slat cutting table clamp in use with a CNC slat cutting table 100 and a piece of metal 200 to be processed on the table. With reference to FIG. 5 and FIG. 6, the first clamping arm is placed below one or more slats 110 of a CNC slat cutting table 100. In the illustrated embodiment, a water bath 300 is beneath the one or more slats of the CNC slat cutting table. In the illustrated embodiment, the second clamping arm is position above the one or more slats. In the illustrated embodiment, the second clamping arm is positioned above a piece of metal, which is also positioned above the one or more slats.

With continued reference to FIG. 6, the position of the first clamping arm is adjusted by rotating the head of the threaded bolt from above the one or more slats. In the illustrated embodiment, a piece of metal 200 is clamped to the CNC slat cutting table 100 by multiple CNC slat cutting table clamps.

Figure 8:
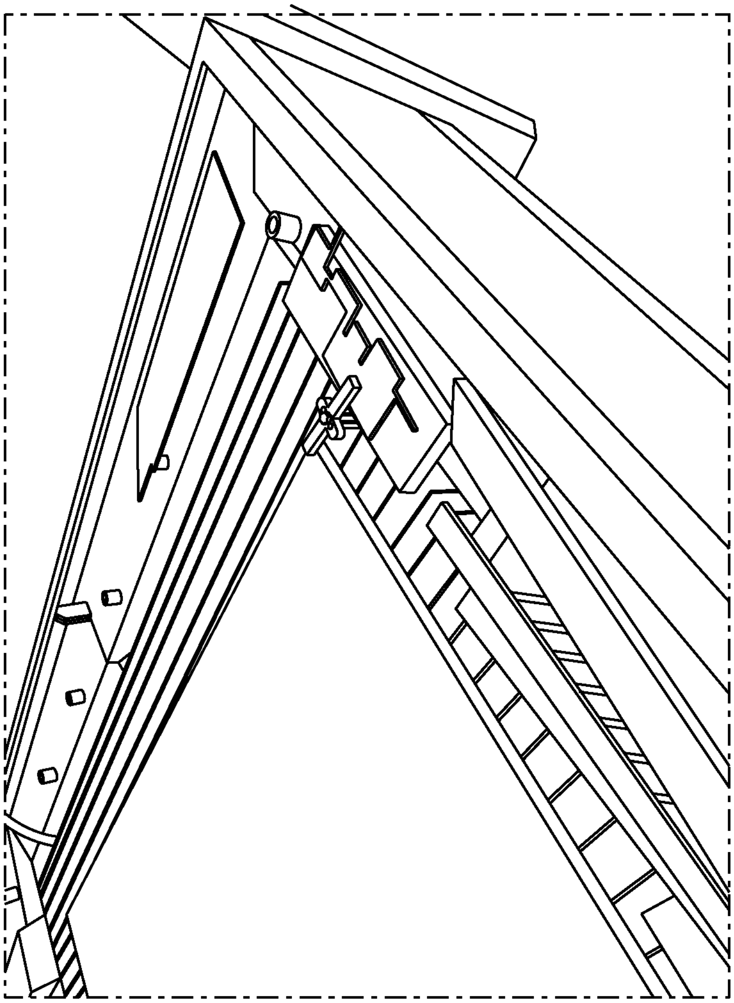
FIG. 8 depicts a view of the CNC slat cutting table clamp in use with a CNC slat cutting table and a piece of metal.
Figure 7:
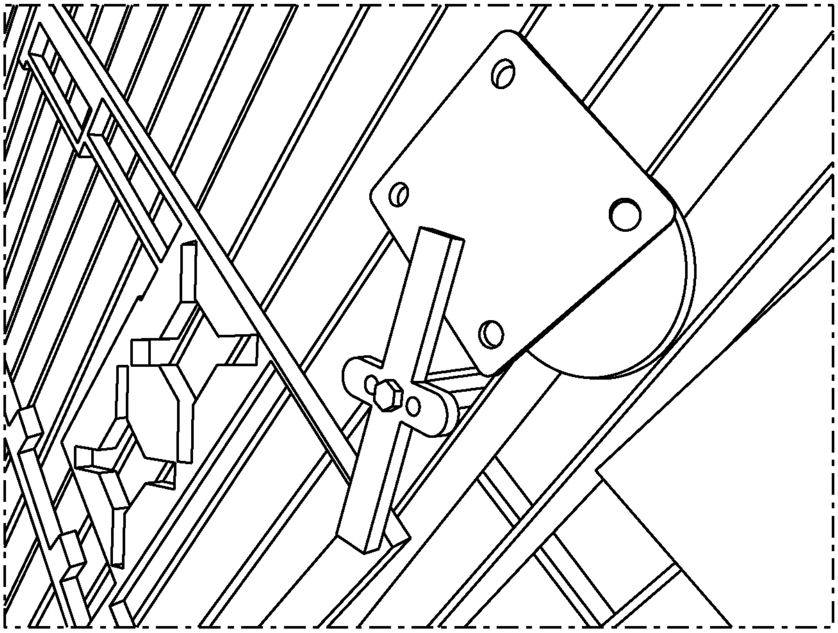
FIG. 7 depicts a view of the CNC slat cutting table clamp in use with a CNC slat cutting table and a piece of metal.

With reference to FIG. 7 and FIG. 8, the CNC slat cutting table clamp is positioned securing two objects. In the illustrated embodiments, both objects are pieces of metal. The first clamping arm is positioned below the one or more slats. In some embodiments, the position of the first clamping arm is adjusted by rotating the head of the threaded bolt from above the one or more slats.

With reference to FIG. 5 through FIG. 8, the CNC slat cutting table clamp being adjustable from above the one or more slats provides for an operator to not have to reach below the one or more slats to adjust the first clamping arm. Having to reach below the one or more slats exposes an operator to a high risk of being cut by the razor-sharp slats, and the dirty water within the water bath.

With continued reference to FIG. 5 through FIG. 8, one or more CNC slat cutting table clamps are used in a CNC slat cutting table system with the CNC slat cutting table. In some embodiments the CNC slat cutting table system includes an object. In some embodiments, the object is the piece of metal. In some embodiments, the CNC slat cutting table system is operated manually. In some embodiments, the CNC slat cutting table system includes an actuator. In some embodiments, the CNC slat cutting table system is automated. In some embodiments, the actuator is automated to complete one or more of, positioning the clamps, positioning the objects, and adjusting the tightness of the clamps.

With continued reference to FIG. 5 through FIG. 8, in some embodiments, the actuator is automated by a processor running a computer program, including a non-transitory computer readable storage medium to store a computer readable program, wherein the computer readable program, when executed by the processor within a computer, causes the computer to perform operations for industrial CNC machining, the operations including one or more or all of the following steps: (1) locating and positioning an initial object onto the one or more slats of a CNC slat cutting table, (2) locating and positioning the one or more CNC slat cutting table clamps onto the CNC slat cutting table, where for each CNC slat cutting table clamps, the first clamping arm is positioned below the one or more slats, and the second clamping arm is positioned above initial object, which is necessarily also above the one or more slats, (3) tightening the one or more CNC slat cutting table clamps, where tightening is performed by rotating the head of the threaded bolt on each of the CNC slat cutting table clamps until the initial object is secure on the CNC slat cutting table, (4) performing steps for industrial CNC machining, wherein the initial object is machined, and a final object has different dimensions than the initial object, (5) loosening the one or more CNC slat cutting table clamps, where loosening is performed by rotating the head of the threaded bolt on each of the CNC slat cutting table clamps until the final object is loose on the CNC slat cutting table, (6) locating and removing the one or more CNC slat cutting table clamps from the CNC slat cutting table, and (7) locating and removing the final object from the CNC slat cutting table. In some embodiments, one or more fiducials are affixed to the clamp, the objects, and/or the slats to facilitate accurate recognition and placement of the components. In some embodiments, one or more sensors (e.g., lasers, cameras, etc.) are employed to assist in localization. In some embodiments, the system operate through a combination of manual and automated steps.

With reference to Table 1 and FIG. 9 through 13, exemplary dimensions are given for the illustrated embodiments. The dimensions are calculated by formulas to create various embodiments, including the illustrated embodiment. In some embodiments, the CNC slat cutting table clamp is made from metal.

TABLE 1

| Name of Component | Variable | Standard Dimension (inches) | Formula |
|---|---|---|---|
| Distance between the one or more slats | f(a) | 1.5 | N/A |

TABLE 1-continued

| Name of Component | Variable | Standard Dimension (inches) | Formula |
|---|---|---|---|
| Diameter of the support rods | f(b) | 0.3125 | f(a)/4.8 |
| Width of the first clamping arm and the second clamping arm | f(c) | 0.50 | f(a)/3 |
| Distance between the support rods | f(d) | 0.8125 | f(a) − f(b) − 0.375 |
| Maximum width of the second c lamping arm | f(e) | 1.75 | f(a) + (f(c)/2) |
| Length of a side of the first and second clamping arms | f(f) | 2.5 | N/A |
| Length of the first and second clamping arms | f(g) | 5.5 | (f(f)*2) + f(c) |
| Diameter of the holef or the threaded bolt | f(h) | 0.375 | f(a)/4 |
| Thickness of the first and second clamping arms | f(i) | 0.25 | N/A |
| Length of the bottom plate | f(j) | 1.25 | f(a) − 0.25 |
| Height of the one or more slats | f(k) | 4.0 | N/A |
| Thickness of an object | f(l) | 2.0 | N/A |
| Length of the support rods | f(m) | 6.75 | (f(i)*2) + f(k) + f(l) + 0.25 |
| Length of the threaded bolt | f(n) | 7.0 | f(m) + 0.25 |
| Diameter of the holes for the support rods | f(o) | 0.375 | f(b) + 0.0625 |

Figure 9:
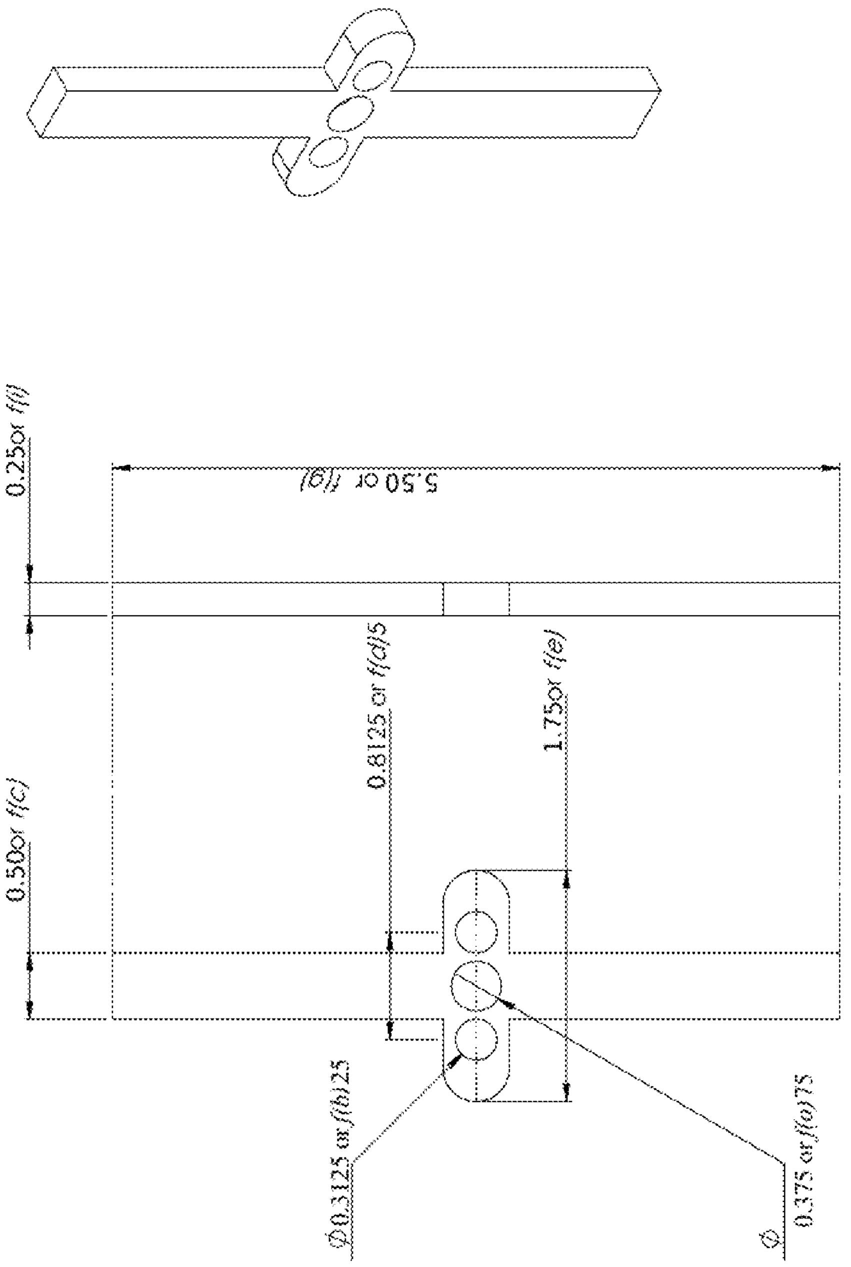
FIG. 9 depicts a technical drawing of the second clamping arm.

With reference to FIG. 9, a mechanical drawing for an embodiment of the second clamping arm is shown. In the illustrated embodiment, a width of the second clamping arm is 0.50 inches. A maximum width of the second clamping arm is 1.75 inches. A length of the second clamping arm is 5.5 inches. A thickness of the second clamping arm is 0.25 inches. In the illustrated embodiment, a diameter of the hole for the threaded bolt is 0.375 inches. A diameter of the holes for the support rods on the second clamping arm are 0.3125 inches. A distance between the support rods is 0.8125 inches.

Figure 10:
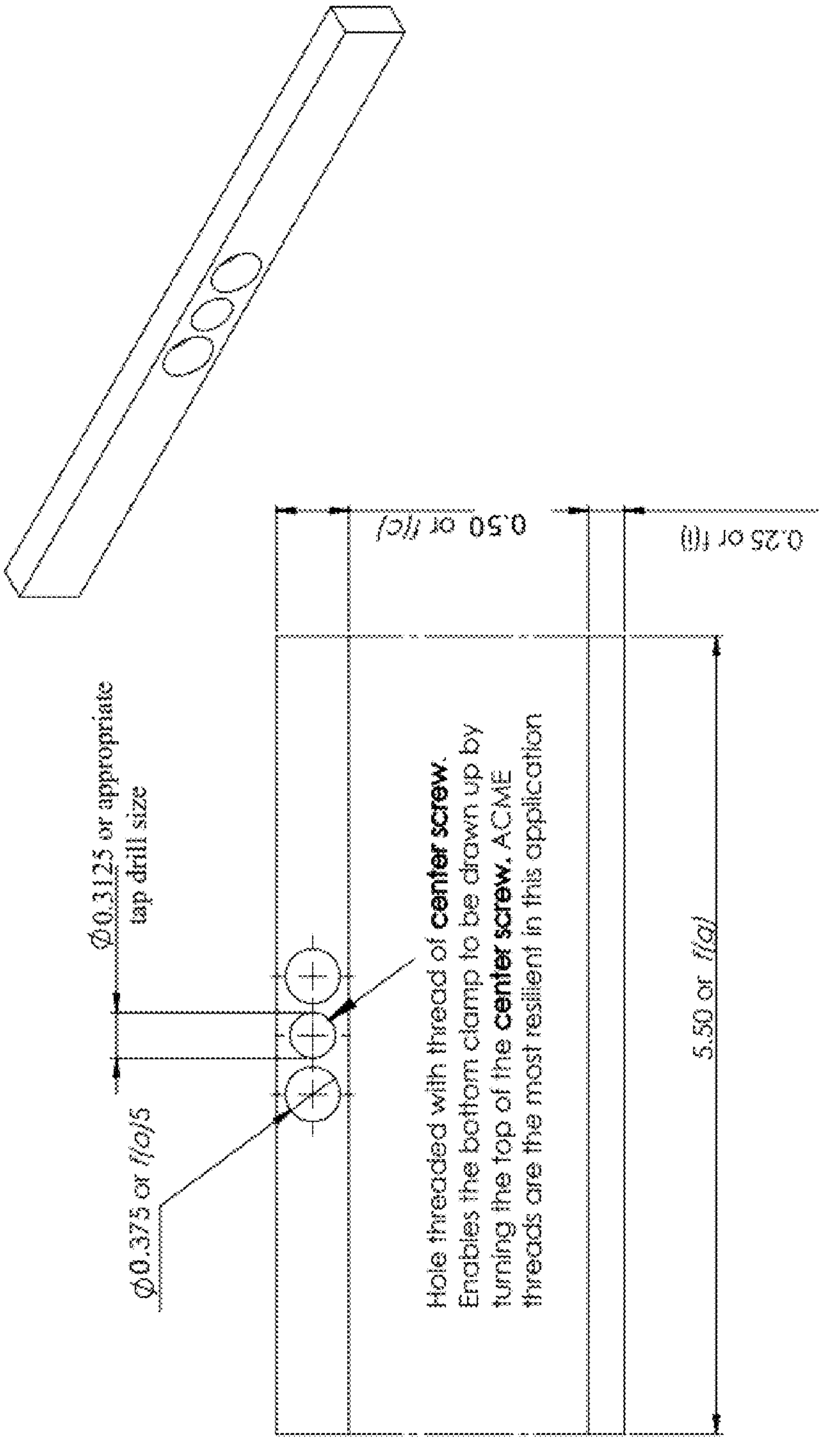
FIG. 10 depicts a technical drawing of the first clamping arm.

With reference to FIG. 10, a mechanical drawing for an embodiment of the first clamping arm is shown. In the illustrated embodiment, a width of the first clamping arm is 0.5 inches. A length of the first clamping arm is 5.5 inches. A thickness of the first clamping arm is 0.25 inches. In the illustrated embodiment, the diameter of the holes for the support rods are 0.375 inches. In the illustrated embodiment, a threaded hole is 0.3125 inches in diameter. In some embodiments, the threaded hole is a different diameter, as the threaded hole should match a diameter of the threaded bolt. In the illustrated embodiment, the threaded hole includes ACME $3/8^{th}$×8 threading. In some embodiments, the threaded hole includes UNC 5/16 18 threading. Threading of the threaded hole should match threading on the threaded bolt.

Figure 11:
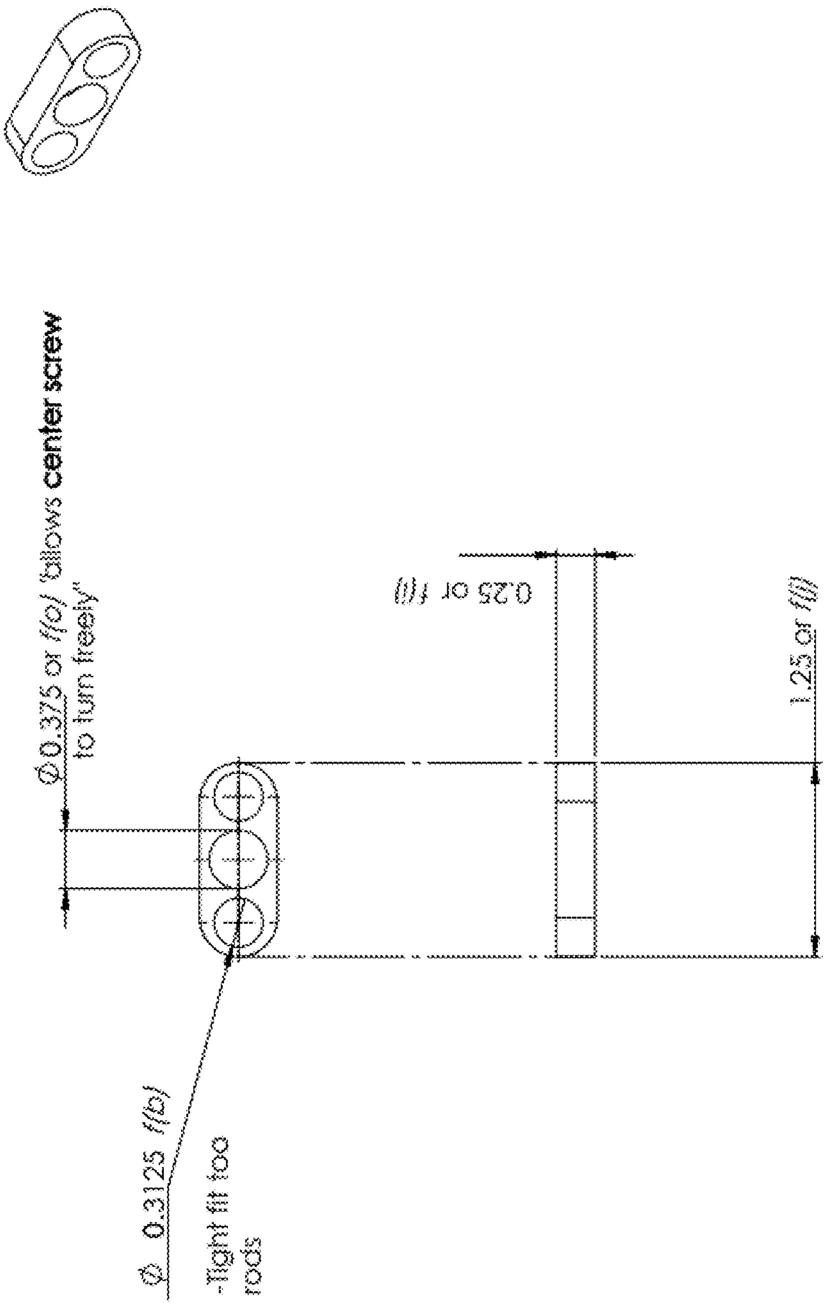
FIG. 11 depicts a technical drawing of the bottom plate.

With reference to FIG. 11, a mechanical drawing for an embodiment of the bottom plate is shown. In the illustrated embodiment, a length of the bottom plate is 1.25 inches. A thickness of the bottom plate is 0.25 inches. In the illustrated embodiment, a diameter of the holes for the support rods on the bottom plate are 0.3125 inches. The diameter of the hole for the threaded rod is 0.375 inches.

Figure 12:
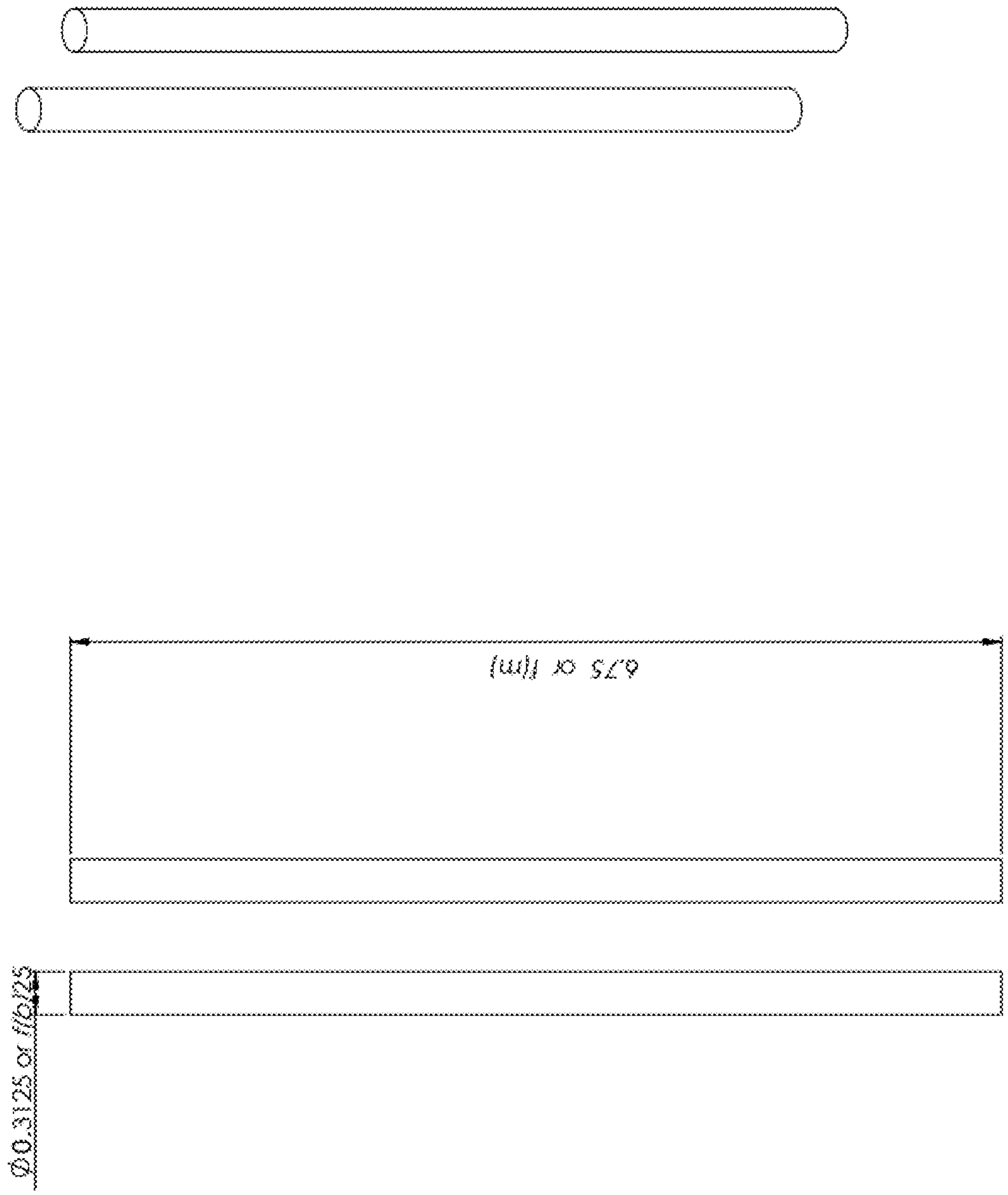
FIG. 12 depicts a technical drawing of the one or more support rods.

With reference to FIG. 12, a mechanical drawing for an embodiment of the support rods is shown. In the illustrated embodiment, a length of the support rods is 6.75 inches. A diameter of the support rods is 0.3125 inches.

Figure 13:
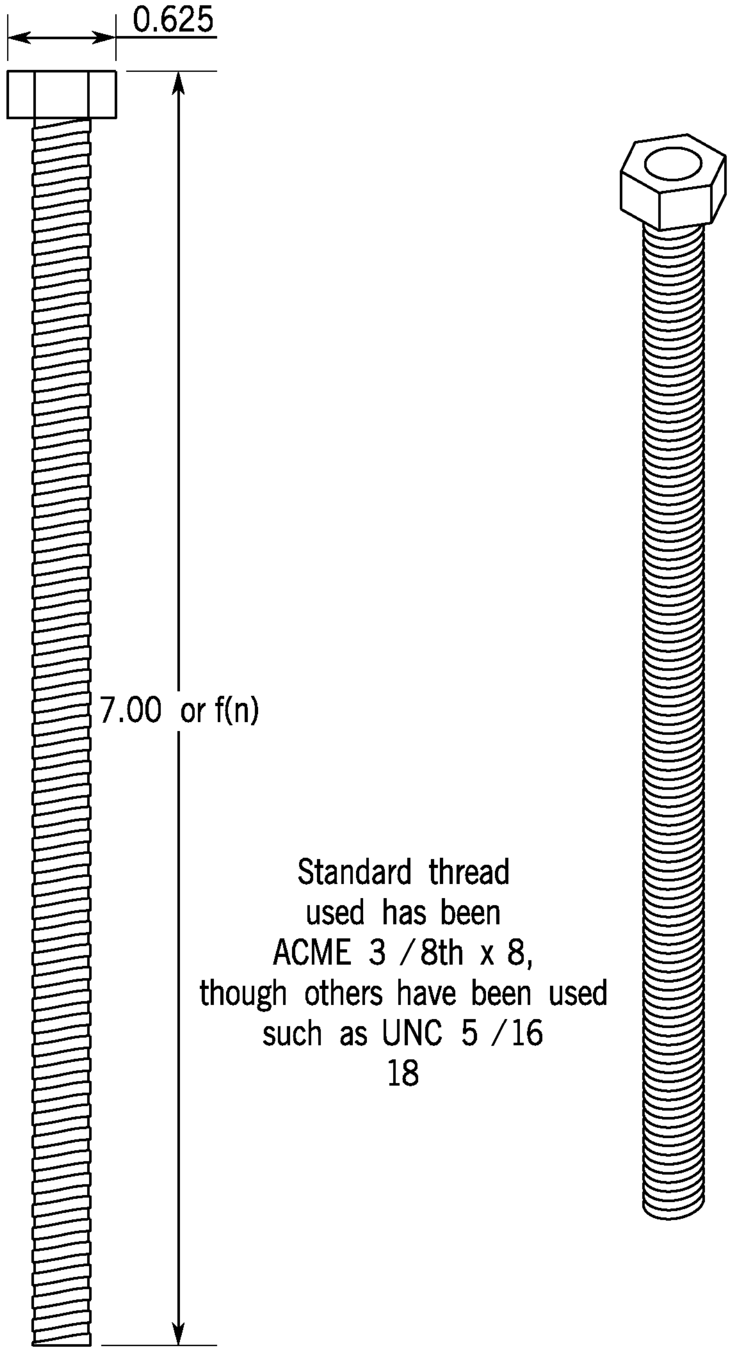
FIG. 13 depicts a drawing of the threaded bolt.

With reference to FIG. 13, a mechanical drawing for an embodiment of the threaded bolt is shown. In the illustrated embodiment, a length of the threaded bolt L3 is 7.0 inches. The head of the threaded bolt includes a nut size of 0.625 inches. In some embodiments, the threaded bolt and the head of the threaded bolt are manufactured as one piece. In some embodiments, the threaded bolt is assembled, with the head of the threaded bolt being a threaded nut, which is welded onto one end of a threaded rod.

With continued reference to FIG. 13, in the illustrated embodiment, the threaded bolt includes the diameter of the threaded bolt. In the illustrated embodiment, the diameter of the threaded bolt is 0.3125 inches. The diameter of the threaded bolt should match the threaded hole. In the illustrated embodiment, the threaded bolt includes ACME $3/8^{th}$×8 threading. In some embodiments, the threaded bolt includes UNC 5/16 18 threading. Threading on the threaded bolt should match threading of the threaded hole.

With reference to FIG. 9 through 13, the illustrated embodiments are assembled to form the CNC slat cutting table clamp. With reference to FIG. 2 and FIG. 3, in the illustrated embodiments, the maximum height of the CNC slat cutting table clamp H is 7.25 inches. In the illustrated embodiments, the overall width of the CNC slat cutting table clamp W1 is 5.5 inches. In some embodiments, the overall thickness of the CNC slat cutting table clamp is 0.25 inches. In the illustrated embodiments, the maximum thickness of the CNC slat cutting table clamp W2 is 5.5 inches.

With continued reference to FIG. 9 through FIG. 13, in some embodiments, the CNC slat cutting table clamp is used with the CNC slat cutting table and an object. In some embodiments, a distance between the one or more slats is 1.5 inches. A height of the one or more slats is 4.0 inches. A thickness of an object is 2.0 inches. In some embodiments, different sized CNC slat cutting table clamps are created using the formulas in Table 1 to calculate their dimensions. This creates an embodiment of the CNC slat cutting table clamp to be used on differently sized CNC slat cutting tables.

Various features and advantages are set forth in the following claims.

I claim:

1. A method of clamping an object to a CNC slat cutting table, wherein a CNC slat cutting table clamp comprises two or more clamping arms, wherein a first clamping arm of the two or more clamping arms comprises a threaded hole, wherein a threaded bolt is configured to engage the threaded hole, the method comprising:

positioning the first clamping arm below one or more slats of the CNC slat cutting table and a second clamping arm of the two or more clamping arms above the one or more slats, adjusting the position of the first clamping arm from above the one or more slats until the CNC slat cutting table clamp is secure on the CNC slat cutting table.

2. The method of claim 1, wherein the first clamping arm is placed in a water bath below the one or more slats.

3. The method of claim 1, wherein the adjusting the position of the first clamping arm from above the one or more slats comprises turning the threaded bolt until the CNC slat cutting table clamp is secure on the CNC slat cutting table.

4. The method of claim 1, wherein the adjusting the position of the first clamping arm comprises turning the threaded bolt by turning a head of the threaded bolt, wherein the head of the threaded bolt is positioned above the second clamping arm.

5. The method of claim 1, wherein the first clamping arm is positioned below the one or more slats without an operator reaching below the one or more slats.

6. The method of claim 1, wherein the position of the first clamping arm is adjusted, and the first clamping arm is secure on the one or more slats.

7. The method of claim 1, wherein adjusting the position of the first clamping arm from above the one or more slats secures an object on the CNC slat cutting table, wherein the object is positioned between the second clamping arm and the one or more slats.

8. The method of claim 1, wherein the object is a piece of metal.

* * * * *